Figure 1:
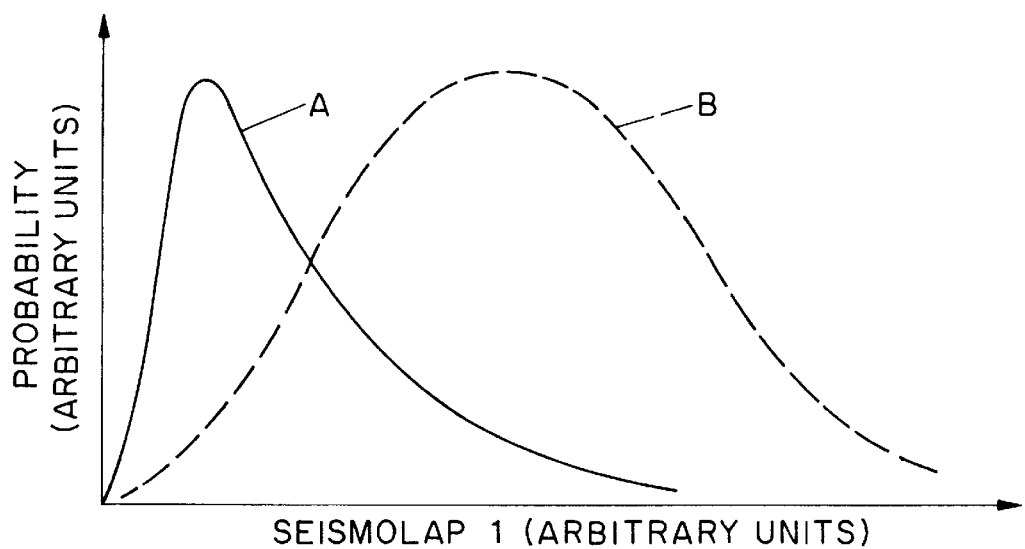

United States Patent [19]
Zschau

[11] Patent Number: 5,890,094
[45] Date of Patent: Mar. 30, 1999

[54] EARTHQUAKE MONITORING

[75] Inventor: Jochen Zschau, Kiel, Germany

[73] Assignee: GeoForschungsZentrum Potsdam, Potsdam, Germany

[21] Appl. No.: 793,761

[22] PCT Filed: Jul. 5, 1996

[86] PCT No.: PCT/EP96/02972

§ 371 Date: Mar. 5, 1997

§ 102(e) Date: Mar. 5, 1997

[87] PCT Pub. No.: WO97/02499

PCT Pub. Date: Jan. 23, 1997

[30] Foreign Application Priority Data

Jul. 5, 1995 [DE] Germany ................. 195 24 507.5

[51] Int. Cl.$^6$ ................................................ G06F 19/00
[52] U.S. Cl. ................................................ 702/15
[58] Field of Search .................... 702/15; 706/929; 367/73; 340/690

[56] References Cited

U.S. PATENT DOCUMENTS

| | | | |
|---|---|---|---|
| 4,604,706 | 8/1986 | Fisher, Jr. et al. | 364/507 |
| 4,904,943 | 2/1990 | Takahashi | 702/15 |
| 5,086,415 | 2/1992 | Takahashi et al. | 367/125 |
| 5,270,649 | 12/1993 | Laukien | 324/300 |
| 5,484,968 | 1/1996 | Nakamura | 181/122 |
| 5,694,129 | 12/1997 | Fujinawa et al. | 340/690 |
| 5,774,419 | 6/1998 | Uhl et al. | 340/690 |

FOREIGN PATENT DOCUMENTS

| | | |
|---|---|---|
| 5195178 | 11/1984 | Japan. |
| 92022657 | 2/1991 | Japan. |

OTHER PUBLICATIONS

"Earthquake Alarms", Technology Review, vol. 96, Iss. 4, May 1993, pp. 18–19.

"Wann Kommt das nächste Beben?" pp. 43–46; bild der wissenschaft Dec. 1993.

"Seismolap Ein neuer Weg zur Erdbebenvorhersage?" 1992/93.

Primary Examiner—Donald E. McElheny, Jr.
Attorney, Agent, or Firm—Baker & Botts, L.L.P.

[57] ABSTRACT

In a method of monitoring parameters of changes in space and time of seismic activity at predetermined points of investigation and times thereof in a region of investigation, more particularly the forecasting of earthquakes, the location and time of quakes of relative low strength (microquakes) are sensed in said region being investigated and the seismic activity of the microquakes is quantified in time and space by means of at least one parameter (SEISMOLAP) at the point of investigation and at the times of investigation, a probability value is established for the occurence of the parameter, and the development of the probability value in time is monitored to detect SEISMOLAP anomalies by clusters of microquakes and/or phases of relative seismic inactivity as activities leading up to more severe quake occurences more accurately in location and more reliably.

11 Claims, 1 Drawing Sheet

EARTHQUAKE MONITORING

DESCRIPTION

The invention relates to a method as set forth in the preamble of claim 1 provided for monitoring the seismic activity parameters in a region of investigation and more particularly to improve the possibilities of predicting (forecasting) earthquakes.

Hitherto it has not been possible to predict time, place (epicenter) and strength (magnitude) of an anticipated earthquake with sufficient accuracy so that corresponding safety precautions, more particularly for protection of the population concerned, can be taken. Methods known hitherto fail to exhibit the necessary reliability to justify setting off an earthquake alarm and, for example, to instigate large-scale evacuation measures.

A method by the name of SEISMOLAP (SEISMicOverLAPping) developed by the present applicant is known which permits a considerable improvement in predicting earthquakes. This method is described in the two-year report 1992/93 of the "GeoForschungszentrum Potsdam". The contents of the this publication hereby is incorporated in the instant description.

The known SEISMOLAP method comprises recording and quantifying two phenomena, namely seismic clustering and seismic inactivity.

Seismic clustering is understood to be focussing minor microquakes in time and space on the point of the later severe earthquake occurence. This phenomen is quantified by forming the so-called SEISMOLAP parameter.

This SEISMOLAP parameter (S in the following) is established as follows (see FIG. 2).

In a region being investigated, provided with a network of investigation locations or points, a table or a catalog of the microquakes having occured is compiled, listing the point in time of each quake, its location and its magnitude. By the known method each microquake is assigned a 2- to 4-dimensional body. In the simplest case this is formed by a square; when including the depth of the quake by a cube centered at the epicenter and furthermore considering the time interval (time window) in which the observation occurs, by a 4-dimensional configuration. The latter has the dimensional "km$^3$ days", the time axis extending, however, only into the past and not into the future.

On the region being investigated a network of grid lines is formed, the intersections of which are assigned in each case a 2- to 4-dimensional body which, for instance, in the two-dimensional case is formed by a square having the same size as the squares assigned to the microquakes.

Usually, the dimensions of the 2- to 4-dimensional bodies assigned to the quakes or points of intersection are equal in size and, depending on the concrete conditions, selected more particularly according to the strength of the main quake sought for or anticipated.

The parameter $S_1$ results from the sum of all overlappings of the 2- to 4-dimensional bodies, each of which is assigned to the quakes or point of intersection (point of investigation) in accordance with equation (1). The two-dimensional case is illustrated in FIG. 2. The locations of the quakes are symbolized by asterisks. The areas denoted black identify the overlappings, the sum of which produces the parameter $S^1$.

$$SEISMOLAP\_1 = S_1(X,Y,Z,T) = \frac{\sum_j \left( \prod_{i=1}^{4} d_{ij} \right)}{\prod_{i=1}^{4} D_i} \quad (1)$$

where dij and $D_1$ resp. is given by:

$$d_{ij} = D_i - \begin{cases} |X - Xj| & \text{für } i = 1, d_{ij} > 0 \\ |Y - Yj| & \text{für } i = 2, d_{ij} > 0 \\ |Z - Zj| & \text{für } i = 3, d_{ij} > 0 \\ (T - Tj) & \text{für } i = 4, d_{ij} > 0 \end{cases}$$

$$d_{ij} = 0 \quad \text{misc.}$$

$(X_j, Y_j, Z_j)$ are the coordinates of the quake occurring at the point in time $T_j$, whilst (X, Y, Z) are the coordinates of the point of investigation. $D_{1-3}$=DX are the dimensions of the space window and $D_4$=DT denotes the time window. With these parameters the "volume" of the 2- to 4-dimensional body is defined which in turn appears in equation (1) as the normalizing factor.

Thus, whilst in the original version the SEISMOLAP method merely established one measure of the spatial concentration of microquakes, in the version known last also a temporal frequency was included in establishing the SEISMOLAP parameter. For this purpose four-dimensional configurations were superimposed which apart from the three spatial coordinates also contained the time as a fourth dimension. This means practically that microquakes located far from a point investigated in the earth's crust, or dating back far in time, make only a minor contribution, or no contribution at all to the SEISMOLAP parameter for a location investigated and a specific point in time. By contrast, those which lie near to the point, i.e. for example within a space window about the location investigated, and not dating far back in time, i.e. for instance within a time window about the point in time concerned, make a major contribution. The denser the microquakes concentrate about the crust location investigated and the more often they occur, the greater is the SEISMOLAP parameter.

The SEISMOLAP parameter can be determined for a specific point of investigation or for a broad region. Optionally the strength of the microquake may also be weighted. The stronger the microquake is, the greater is the corresponding four-dimensional configuration selected.

The effectiveness of this known method was demonstrated, among other things, by application ("postcasting") to the Sapanca quake (9.12.1988, M=4.2 on the open Richter scale). A few days prior to the quake the SEISMOLAP parameter at the epicenter strongly departed from the zero line and signalized on the evening prior to the day of the quake the coming occurence by a particularly strong increase (see FIG. 10 of the aforementioned two-year report 1992/93). This behaviour of the SEISMOLAP parameter in the direct time window of a major quake is termed a SEISMOLAP anomaly.

SEISMOLAP_1 is a direct measure of seismic clustering, whereas the seismic inactivity is quantified by a reciprocal value of this parameter (SEISMOLAP_2 or $S_2$), see equation (2), $$SEISMOLAP\_2 = S_2(X,Y,Z,T) = (S_1)^{-1} \quad (2)$$

The possibility of being able to distinguish not only phases of activity but also phases of inactivity was thus found by considering the reciprocal value of SEISMOLAP_1.

As an alternative to equation (2) the reciprocal value of SEISMOLAP_1 may be formed with respect to a larger window in space about the point of investigation. This is indicated by the index GR of the parameter $S_1$.

The linear combination of both parameters $S_1$ and $S_2$:

$$AS_1 - B1/S_{1,GR} = AS_1 - BS_{2,GR}$$

permits a gradual distinction of both seismic phases of activity and inactivity, the index GR signifying a greater area about the point of investigation and $S_{1,GR}$ the SEISMOLAP_1 parameter established for this area.

Where applied to the Sapanca quake of December 1988 a pronounced phase of inactivity, lasting roughly two weeks up to one to two days prior to phase of activity commencing the quake, materializes. In other cases even longer phases of inactivity materialized, whereby in part the phase of inactivity started several months up to a few years prior to the major earthquake occurence. This duration relates to the strength of the coming, more severe quake. In the time development of SEISMOLAP_2 such phases of inactivity can be highlighted particularly well. These observations have resulted in investigations being focused on the computation and recording of the SEISMOLAP_2 parameter since, in principle, this is in a position to forecast the earthquake occurence a few weeks or months before, or in the case of very severe quakes, even years before.

The method employed hitherto has the drawback that it hadn't yet taken into account that the locations at which the values of $S_1$ or $S_2$ are computed and monitored may exhibit a differing basic activity. At a location having a higher seismic basic activity any relative seismic inactivity recorded there has a different meaning to a relative seismic inactivity recorded at a location exhibiting a low seismic basic activity. Hitherto the method failed to take these locational differences into account which may result in a false prediction. In any case, predicting was unreliable due to this.

It is thus the object of the present invention to define an improved method of monitoring the parameters of seismic activity in a region being investigated, and a device for implementing this method which more particularly permits enhanced reliability in earthquake prediction. More particularly it is the object of the present invention to define a method of monitoring the parameters of seismic activity which is capable of furnishing an improved means of comparing the SEISMOLAP_2 parameters recorded locationally.

This object is achieved by the subject matters of claims 1 and 11. Advantageous embodiments of the invention are set forth in the sub-claims.

The method in accordance with the invention achieves the object as cited above more particularly in such a manner that the values SEISMOLAP_1 or SEISMOLAP_2 are no longer investigated as an indicator for an imminent major occurence (earthquakes of strength M>4) but, instead, the probability of the SEISMOLAP values occurring is used. Extreme values of SEISMOLAP_2 as are observed for example in the case of a seismic inactivity then occur as signalizable values with extremely low probability. This ensures that the locational values can be compared even when at the various locations a different basic activity of the microquake activity exists. The probability can be determined in the method e.g. from adapting the "Pearson type 3 probability distribution" to the frequency distribution of the SEISMOLAP values. This probability distribution is often made use of in water management is modelling extreme water levels.

The method requires that for each location, for which a prediction is to be made, an adaptable frequency distribution exists, i.e. that for each such location SEISMOLAP values have been recorded over a sufficiently long period in time so that SEISMOLAP values can be derived and a frequency distribution formed from these SEISMOLAP values can be adapted by a plot of a Pearson type 3 probability distribution.

Figure 2:
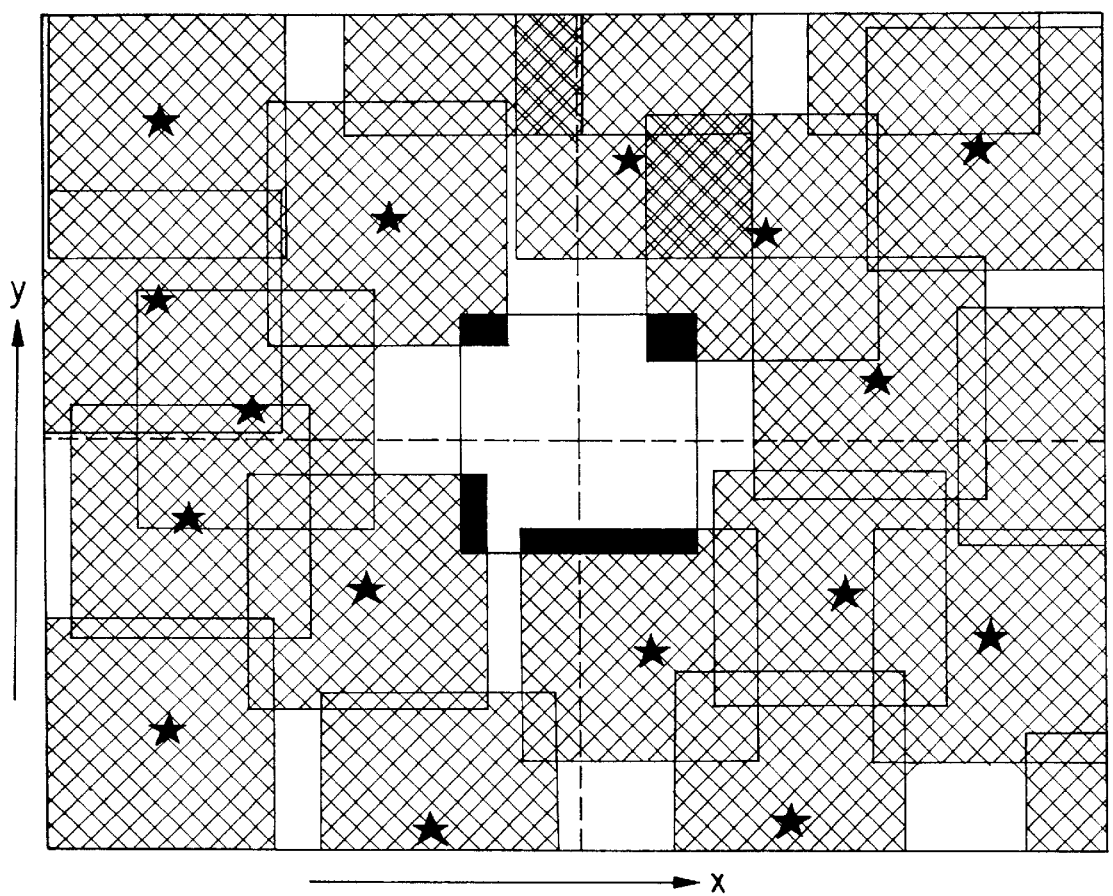

The invention will now be described in more detail with reference to the attached FIGS. in which:

FIG. 1 plots the probability distributions of the SEISMOLAP_1 parameter for two different points of investigation; and FIG. 2 illustrates establishing the SEISMOLAP_1 parameter as known from prior art.

In accordance with the invention at least one of the parameters SEISMOLAP_1 or SEISMOLAP_2 is firstly established over a predetermined period of time at a location of interest in the region being investigated, from which corresponding frequency distributions are plotted.

For this purpose a time period of n-times (n>1) of the time window used in calculating the SEISMOLAP values is selected. Typically n equals 3 so that for a time window of e.g. 100 days SEISMOLAP data of 300 days are needed for plotting the frequency distribution and for subsequently adapting a Pearson type 3 probability curve.

Subsequently, for the corresponding occurence a probability value is established from each parameter by adapting a probability distribution to the frequency distribution.

Preferably a strongly asymmetrical probability distribution is selected which permits adapting to extreme values occurring relatively seldomly. This is satisfied e.g. by the Pearson type 3 probability distribution in accordance with the following equation (3)

$$P(\epsilon) = (1/\Gamma(m)) \int_0^\epsilon \alpha^{m-1} e^{-\alpha} d\alpha \qquad (3)$$

$\epsilon = (2/C_{SS})\{(S-\mu_S)/\sigma_S + 2/C_{SS}\} > 0$
$m = (4/C_{SS}^2) > 0 \mu_S = (1/\iota) \Sigma_{i=o}^{i-1} S_i$
$\sigma_S = (1/(\iota-1))\{\Sigma_{i=o}^{i-1}(S_i - \mu_S)^2\}^{1/2}$ $C_{SS} = \{\iota^{1/2} \Sigma_{i=o}^{i-1}(S_i - \mu_S)^3\} / \{(\iota-1)^{3/2} \sigma_S^3\}$ where $s = S_2 (T_k)$ is the instant value of SEISMOLAP_2 at the point in time $T = T_k$, the value to which a probability value is to be assigned, $S_i = S_2 (T_k)$ are values of SEISMOLAP_2 at the point in time $T = T_{k-i}$ in the statistical time window, 1 is the number of values of SEISMOLAP_2 in this window, $\Gamma(m)$ is the gamma function.

In equation (3), $P(\epsilon)$ is the probability of the value e being exceeded. If $C_{SS}$ is positive, then $P(\epsilon)$ is identical to the probability of the SEISMOLAP_2 value s being exceeded. In this case $1/P(\epsilon)$ (corresponding to 1/probability) is a direct measure for seismic inactivity. Thus, the higher is $1/P(\epsilon)$, the less is the probability that a very low level of seismic activity can be considered as being normal. If $C_{SS}$ is negative then $1/(1-P(\epsilon))$ must be used instead.

From each probability value a further parameter SEISMOLAP_3 is established:

$$SEISMOLAP\_3 = S_3(X, Y, Z, T) = \begin{cases} 1/P(\epsilon) & \text{für } C_{ss} \geq 0 \\ 1/(1 - P(\epsilon)) & \text{für } C_{ss} < 0 \end{cases} \qquad (4)$$

This probability value of at least one parameter (as an alternative to the description as regards SEISMOLAP_2 the probability value may also be determined with respect to SEISMOLAP_1) is then stored for the point of investigation (X, Y, Z) of interest and for every further investigation time $(T_k)$.

In FIG. 1 probability distributions of the parameter SEISMOLAP__1 for two different locations are represented by curves A and B (dashed) by way of example. Since the parameter SEISMOLAP__2 in principle represents the reciprocal value of SEISMOLAP__1, corresponding probability curves can also be plotted for SEISMOLAP__2. It is evident from FIG. 1 that the location corresponding to the plot A shows a relative low basic level of seismic activity, since the maximum of its probability distribution, as compared to plot B, lies at a relative low value of SEISMOLAP__1. Accordingly, also phases of relative seismic inactivity are considerably more probably at location A so that concluding an imminent activity is not necessarily certain as yet from a low value of SEISMOLAP__1, whereas in the case of plot B the maximum of the probability distribution is shifted to higher values of SEISMOLAP__1. The location B thus exhibits a relative basic level of seismic activity. Accordingly, at location B phases of relative seismic activity are considerably more probable than at location A so that here concluding an imminent activity is not necessarily certain as yet from a high value of SEISMOLAP__1. Thus, for each location of interest it is not the development in time of the established SEISMOLAP value which is considered, but that of the associated probability value established from the probability distribution. This probability value is comparable locationally so that the comparability of the predicting method is improved overall locationally and thus the spatial position of the anomaly can be determined more accurately.

In conclusion the occurence of activities leading up to earthquakes are each recorded and/or signalized in the form of microquake clusters and/or seismic inactivity for the point being investigated when the probability value for a sequence of points in time exhibit a significant change (falling or rising tendency). Signalizing may be triggered in any suitable form by means for outputting optical or acoustical signals or other display indications as soon as the probability value violates a specific threshold in response to the region being investigated in each case or exceeds a corresponding threshold of a defined rate of change per unit of time.

The method in accordance with the instant invention has, apart from the advantage of permitting the results,to be compared spatially and thus better pin-pointing the location, also the advantage that the signal-to-noise ratio is improved. In addition to this the result is achieved more or less irrespectively of the average number of quakes occurring in the selected space window.

The method in accordance with the invention has since been successfully tested with the data obtained from more than 100 earthquake events in "postcasting", including disasters such as Spitak (Armenia, 1988), Loma Prieta (US, 1989), Landers (US, 1992), Hokkaido (Japan, 1993), Northridge (USA, 1994), Kobe (Japan, 1995) and Aigon (Greece, 1995).

As a special modification of the method in accordance with the invention a further window can be introduced for a fifth dimension, namely the magnitude of the microquakes, in the same way as for the other four dimensions (space and time). This modification makes it possible to detect the SEISMOLAP anomalies pointing to quakes even when they occur only in certain magnitude bands. For this purpose the point of investigation is assigned a magnitude window about the central magnitude. Likewise, each microquake is assigned a window about its sensed magnitude, it being usual that windows of the same size are selected for both kinds. The overlap of the two windows then determines the contribution of a specific band (or interval or range) of magnitude to the SEISMOLAP parameter in the same way as for the other four dimensions.

As an alternative, processing can be done to advantage also merely with a lower magnitude threshold which permits, for example, the activities leading up to very severe occurrences (also to be viewed in largish microquake magnitudes) to be separated from those of occurences which are not so severe (to be viewed merely in smallish microquake magnitudes). A corresponding separation may also be made in a similar way by suitably selecting the two other free parameters of the method (time window and space window).

A device for implementing the method in accordance with the invention uses e.g. a network of 15 seismographs which are suitably arranged in the region under investigation. The region of investigation has, for example, a size of approx. 200,100 km. The seismographs sense the seismic vibrations and supply the vibration values to a system which determines point in time, position and strength of the microquakes and then realizes the method as described. This system may be more particularly a computer or memory unit comprising means for implementing each of the steps of the method in accordance with the invention and, where appropriate, signalizing means.

I claim:

1. A method of monitoring parameters of changes in space and time of the seismic activity at predetermined points of investigation (X, Y, Z) and times of investigation ($T_k$) in a region of investigation, in the method of which the location and time of quakes of relative low strength (microquakes) are sensed in said region of investigation and the seismic activity of the microquakes is quantified by means of at least one parameter ($S_1$, $S_2$) at said point of investigation (X, Y, Z) and at said times of investigation $T_k$), each of at least one of said parameter ($S_1$, $S_2$) being a time-variable measure for the accumulation in space and time of said microquakes and/or the seismic inactivity at said point of investigation (X, Y, Z) characterized by the steps a) sensing at least the one parameter ($S_1$, $S_2$) over a predetermined period of time and generating a frequency distribution of said at least one parameter for each point of investigation;

b) establishing a probability value corresponding to the occurence of each parameter by adapting a probability distribution to said frequency distribution;

c) establishing and storing said probability value of the at least one parameter for said point of investigation (X, Y, Z) at each further time of investigation $T_k$);

d) recording and/or signalizing the occurence of each activity leading to an earthquake in the form of microquake clustering and/or seismic inactivity for the point of investigation, when said probability value exhibits a significant change, more particularly of a falling or rising tendency for a sequence of points in time.

2. The method as set forth in claim 1, at least one parameter being formed by a first parameter (SEISMOLAP__1, $S_1$) and/or a second parameter (SEISMOLAP__2, $S_2$), said second parameter (SEISMOLAP__2, $S_2$) being the reciprocal value of said first parameter (SEISMOLAP__1, $S_1$).

3. The method as set forth in claim 1, at least one parameter being formed by a first parameter (SEISMOLAP__1, $S_1$) and/or a second parameter (SEISMOLAP__2, $S_2$), said second parameter (SEISMOLAP__2, $S_2$) being the reciprocal value of a parameter (SEISMOLAP__$1_G$, $S_{1,G}$) corresponding to said first parameter (SEISMOLAP_1, $S_1$) when the latter is established for a reference area greater in comparison to the region being investigated.

4. The method as set forth in claim 2, said first parameter (SEISMOLAP_1, $S_1$) being determined such that to each microquake is assigned a window in space and time and the overlaps of the windows of each microquake are computed and summed together with a window defined in space and time at said point of investigation.

5. The method as set forth in claim 4, said time period in said step a) of the method corresponding to a multiple, more particularly, 3-times the length of said time window.

6. The method as set forth in claim 1, said probability distribution being a strongly asymmetrical probability distribution which is adaptable to extreme values occurring relatively seldomly.

7. The method as set forth in claim 6, said probability distribution being a Pearson type 3 probability distribution.

8. The method as set forth in claim 4, said magnitude of said space window being selected in response to the strength of said microquake.

9. The method as set forth in claim 4, said point of investigation and each said microquake is additionally assigned a magnitude window and said overlap of said magnitude window of said point of investigation being entered in the calculation of said first parameter with each magnitude window of said microquakes.

10. The method as set forth in claim 1, said point of investigation being assigned a lower magnitude threshold and only microquakes being taken into account whose magnitude lie above said threshold.

11. A device for implementing a method according to claim 1 characterized by a network of devices for detecting the seismic activity in said region being investigated and by a computer system for computing said at least one parameter, said frequency distribution and for adapting said probability distribution to said frequency distribution.

* * * * *

UNITED STATES PATENT AND TRADEMARK OFFICE
CERTIFICATE OF CORRECTION

Page 1 of 2

PATENT NO. : 5,890,094

DATED : March 30, 1999

INVENTOR(S) : Jochen Zschau

It is certified that error appears in the above-identified patent and that said Letters Patent is hereby corrected as shown below:

Column 2, equation (1), "$\dfrac{\sum_j \left( \prod_{i=1}^{4} d_{ij} \right)}{\prod_{i=1}^{4} D_i}$" should read -- $\dfrac{\sum_j (\prod_{i=1}^{4} d_{ij})}{\prod_{i=1}^{4} D_i}$ --

Column 3, line 6, "$AS_1 - B1/S_{1,GR} = AS_1 - BS_{2,GR}$" should read -- $A \cdot S_1 - B \cdot 1/S_{1,GR} = A \cdot S_1 - B \cdot S_{2,GR}$ --;

Column 3, line 10, "$S_{1,GR}$" should read -- $S_{1,GR}$ --;

Column 4, equation (3), "S" (all occurrences) should read -- s --;

Column 4, equation (3), "$(4/C_{ss}^2)$" should read -- $(4/C^2_{ss})$ --;

Column 4, equation (3), "$(1/t)$" should read -- $(1/l)$ --;

UNITED STATES PATENT AND TRADEMARK OFFICE
CERTIFICATE OF CORRECTION

PATENT NO. : 5,890,094

DATED : March 30, 1999

INVENTOR(S) : Jochen Zschau

It is certified that error appears in the above-identified patent and that said Letters Patent is hereby corrected as shown below:

Column 4, equation (3), "(t-1)" should read -- ($l$-1) --;

Column 4, equation (3), "$t^{1/2}$" should read -- $l^{1/2}$ --;

Column 4, line 44, "$S_i=S_2 (T_k)$" should read -- $s_i=S_2 (T_k)$ --.

Signed and Sealed this

Eleventh Day of July, 2000

Attest:

Q. TODD DICKINSON

*Attesting Officer*  *Director of Patents and Trademarks*